L. R. CONVERSE.
HAND-POWER FOR PROPELLING VEHICLES.

No. 182,896.                                Patented Oct. 3, 1876.

WITNESSES
Henry N. Miller
C. L. Evert

INVENTOR
L. R. Converse
By Alexander Mator
Attorneys

UNITED STATES PATENT OFFICE.

LUCIUS R. CONVERSE, OF SHENANDOAH, IOWA.

IMPROVEMENT IN HAND-POWER FOR PROPELLING VEHICLES.

Specification forming part of Letters Patent No. 182,896, dated October 3, 1876; application filed May 29, 1876.

*To all whom it may concern:*

Be it known that I, L. R. CONVERSE, of Shenandoah, in the county of Page and in the State of Iowa, have invented certain new and useful Improvements in Hand-Power for Propelling Vehicles; and do hereby declare that the following is a full, clear, and exact description thereof, reference being had to the accompanying drawings, and to the letters of reference marked thereon, making a part of this specification.

The nature of my invention consists in the construction and arrangement of a hand-power for propelling vehicles, as will be hereinafter more fully set forth.

In order to enable others skilled in the art to which my invention appertains to make and use the same, I will now proceed to describe its construction and operation, referring to the annexed drawings, in which—

Figure 1:
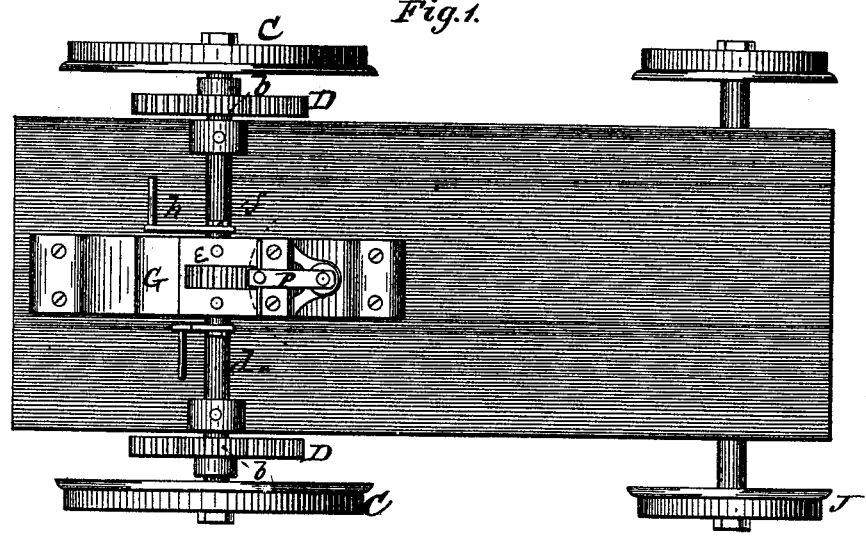
Figure 2:
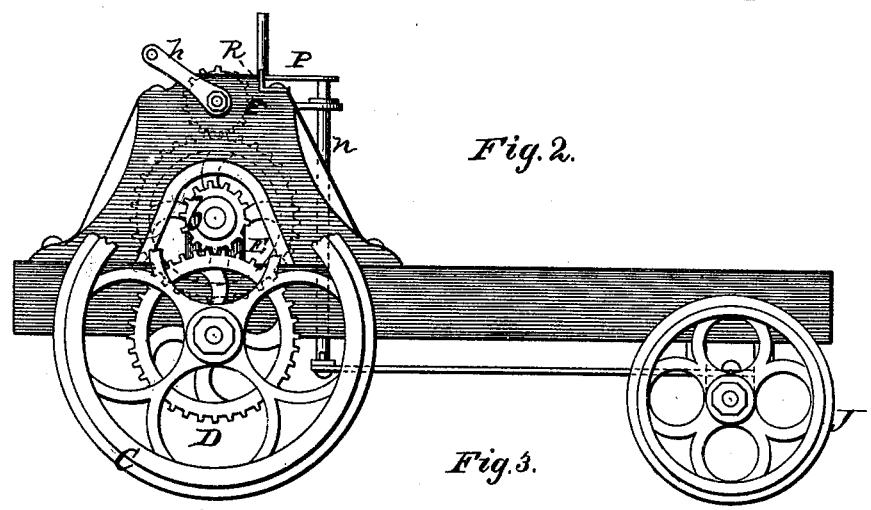
Figure 3:
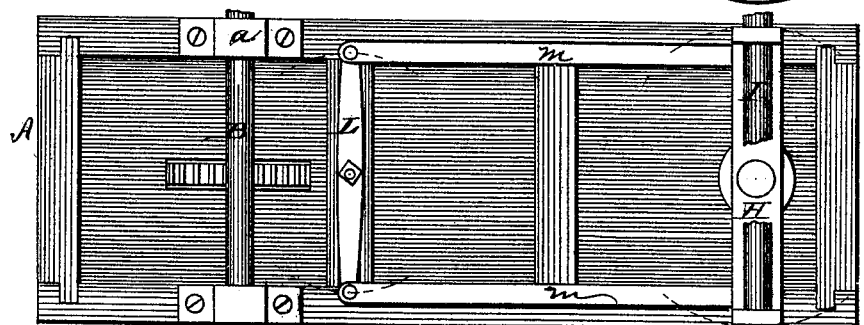

Figure 1 is a plan view of a vehicle embodying my invention. Fig. 2 is a side elevation of the same, and Fig. 3 is a bottom view thereof.

A represents the bed of a vehicle having suitable boxes $a\ a$, in which the hind axle B turns, said axle having the wheels C secured on its ends. On each end of the hind axle B is secured a cog-wheel, D, which meshes with a pinion, $b$, on the end of a shaft, $d$, having its bearings in suitable posts or standards on top of the bed A. In the center of the shaft $d$ is secured a large cog-wheel, E, which meshes with a pinion, $e$, on a short shaft, $f$, having its bearing in the upper portion of a stand, G, erected on the bed A. On each end of the shaft $f$ is a crank, $h$, by means of which the shaft is rotated, and power communicated through the gearing, as described, to the axle B, for rotating the same and propelling the vehicle. I is the front axle provided with the wheels J J, and having its bearings in the downwardly-bent ends of a bar, H, which is pivoted through its center to the under side of the bed A. From near the ends of the bar H rods $m\ m$ connect with the ends of a cross-bar, L, secured to the lower end of a vertical shaft, $n$, which passes up through the bed A and front end of the stand G, and has upon its upper end a crank or handle, P, by the means of which the parts are easily operated, so as to turn the front axle to either side, and thereby guide the vehicle. The crank P is held in a notched plate, R, to keep the wheels in line for moving straight ahead, and when it is desired to turn either to the right or left, the crank is lifted out of the slot, and turned to either side, as required.

This mechanism may be used on rails or on ordinary roads by simply changing the wheels to correspond, and by changing the gearing faster or slower motion may be had, as desired.

I do not claim a hand-car in which the power is applied through the medium of a double seat vibrating on a pivot, as such is not my invention.

Having thus fully described my invention, what I claim as new, and desire to secure by Letters Patent, is—

1. The combination of the front axle B, provided with wheels C C, and provided with cog-wheels D D on the outside of the body, and near each driving-wheel, the shaft $d$ mounted in bearings on top of the body, and provided with a pinion, $b$, at each end, which gear into the cog-wheels D D, and having a center cog-wheel, E, and the shaft $f$, with pinion $e$, and cranks $h\ h$, all substantially as and for the purposes herein set forth.

2. The combination of the front axle I with wheels J J, the pivoted bar H, with downwardly-bent ends connecting-rods $m\ m$, shaft $n$, with lever L, and crank P, and the notched plate R, all substantially as and for the purposes herein set forth.

In testimony that I claim the foregoing I have hereunto set my hand this 2d day of May, 1876.

LUCIUS R. CONVERSE.

Witnesses:
W. A. WILSON,
L. WATERS.